(12) United States Patent
Rew (10) Patent No.: US 6,411,000 B1
(45) Date of Patent: Jun. 25, 2002

(54) MOTOR WITH A COOLING MEANS

(75) Inventor: Ho Seon Rew, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/496,952

(22) Filed: Feb. 3, 2000

(30) Foreign Application Priority Data

Nov. 2, 1999 (KR) ............................................. 99-48157
Nov. 2, 1999 (KR) ............................................. 99-48158
Nov. 2, 1999 (KR) ............................................. 99-48159

(51) Int. Cl.[7] ............................................... H02K 9/00
(52) U.S. Cl. ............................ 310/62; 310/63; 415/199.1
(58) Field of Search .............................. 310/52, 58, 59, 310/60 R, 61, 62, 63, 60 A; 417/313, 409; 416/115, 120, 157 B, 175, 223 R, 223 B; 415/199.4, 199.5, 199.6, 198.1, 199.1

(56) References Cited

U.S. PATENT DOCUMENTS

| | | | |
|---|---|---|---|
| 2,690,513 A | * | 9/1954 | Tamm .............................. 310/62 |
| 4,797,602 A | * | 1/1989 | West ............................... 322/10 |
| 5,375,637 A | * | 12/1994 | Matsumoto et al. ......... 144/136 |
| 5,925,960 A | * | 7/1999 | Hayes ........................... 310/211 |
| 6,144,121 A | * | 11/2000 | Ishida et al. .................... 310/50 |

* cited by examiner

*Primary Examiner*—Nestor Ramirez
*Assistant Examiner*—Dang Dinh Le
(74) *Attorney, Agent, or Firm*—Fleshner & Kim, LLP

(57) ABSTRACT

A motor with a cooling mean is provided which includes a rotation axis, a rotator assembly fixed to the rotation axis, a stator assembly that surrounds the rotator assembly, a bearing attached to both ends of the rotation axis to support the rotation axis, an axial-flow fan or a hybrid fan used as a cooling means places between each bearing and the rotator assembly to cool the stator assembly and the rotator assembly, and an endshield attached to both ends of a housing to protect the structure. The motor with a cooling means further includes a plurality of air intakes; a plurality of through holes attached to the rotator assembly to circulate the air, and a plurality of concave grooves or cooling pins formed in a surface of the endshield to enlarge the cooling area to discharge the heat in the inside of the motor. Thereby, the cooling efficiency is substantially improved, the operation of the motor becomes more stable, and the life span of the motor is increased.

19 Claims, 11 Drawing Sheets

MOTOR WITH A COOLING MEANS

BACKGROUND OF THE INVENTION

The present invention relates to a motor with a cooling means. More particularly, this invention relates to a motor with a cooling means that can efficiently cool heat of a motor generated during the operation of a motor.

In general, a motor is classified into a DC motor and an AC motor. The DC motor, such as a series motor, a shunt motor and a compound motor, rotates as DC power is supplied to a rotator. The AC motor rotates by using AC power, and an induction motor, a synchronous motor and an alternating current commutator motor are such kinds. Electric energy is consumed in a coil member of a motor and heat is generated while a motor is driven due to a high-speed rotational motion. The generated heat may cause damage to a motor, for example, a severe heat burning of a coil may incur. Therefore, it is necessary that heat generated in the motor while the motor is running must be discharged. Accordingly, there have been many means put forth in effort to resolve the cooling problem in the motor.

Figure 1:
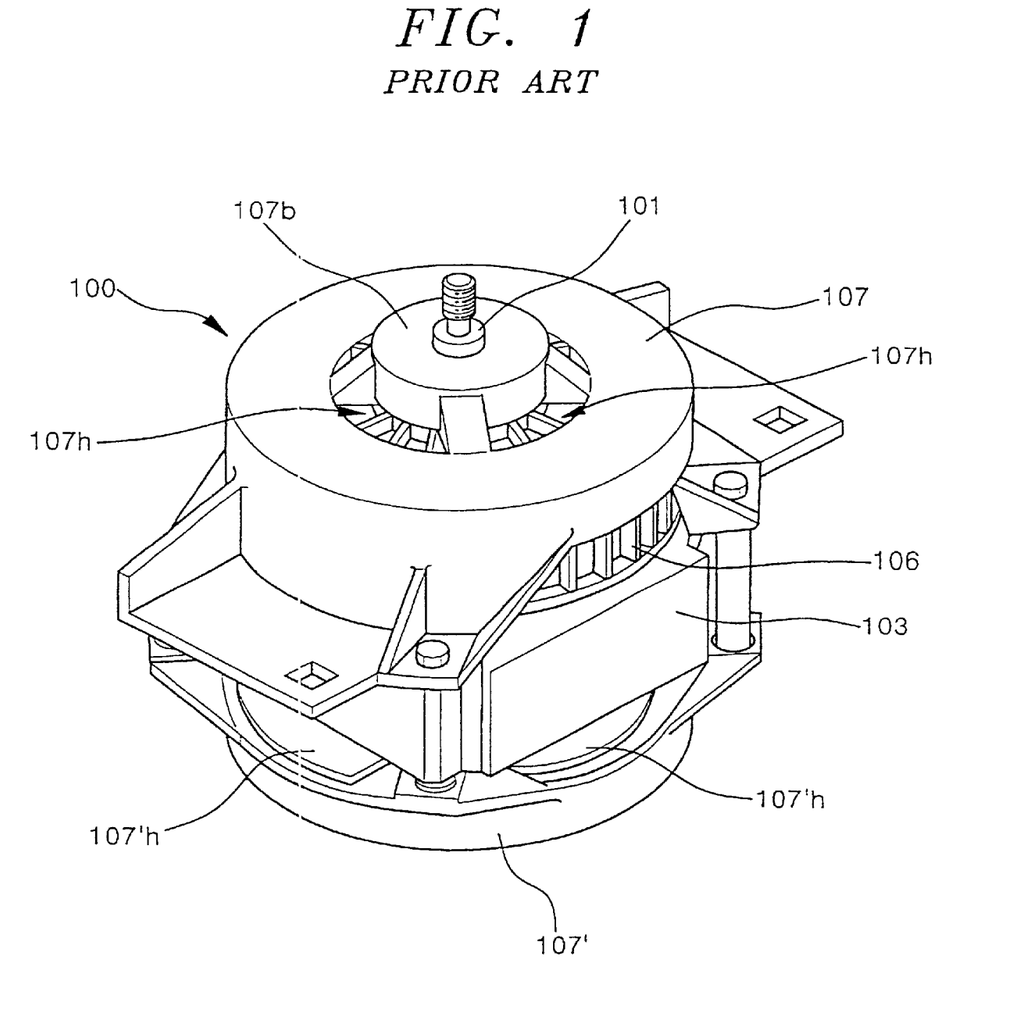
FIG. 1 is a perspective view of the conventional induction motor.
Figure 2:
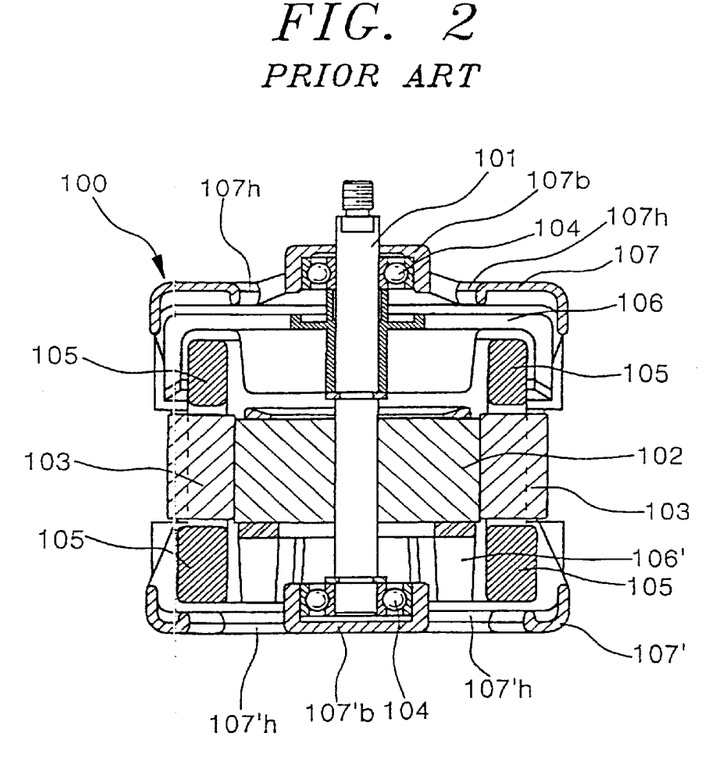
FIG. 2 is a vertical cross sectional view of the conventional induction motor.

FIGS. 1 and 2 illustrate the conventional motor, where FIG. 1 is a perspective view and FIG. 2 is a vertical cross section.

Referring to FIGS. 1 and 2, the conventional motor 100 comprises: a rotation axis 101 located in the center of a motor; a rotator assembly 102 fixed on to the rotation axis 101 by the pressure and rotates with the rotation axis 101; a stator assembly 103 installed in order to surround the rotator assembly 102; a bearing 104 is installed to support the rotation axis 101; and, a stator winding 105 individually placed in upper and lower portions of the stator assembly 103. Also, radial fans 106, 106' are installed in between upper and lower portion of the bearing 104 and a upper and lower portions of the stator winding 105 to circulate air to cool the inside of the motor. And, outer parts of upper and lower portions of the bearing 104 are attached with an endshield 107 and 107' consists of a bearing housing 107b, 107'b to protect the interior structure and an air inlet member 107h, 107'h and to draw in the air.

In the conventional motor, when electric power is supplied to the stator winding 105, a rotating magnetic field is generated by the stator winding 105. And, the rotator assembly 102 is rotated through the interaction between the rotating magnetic field and the magnetic field generated by the permanent magnet of the rotator assembly 102. Accordingly, the rotation axis 101 fixed on to the rotator assembly 102 rotates and at the same time the radial fan 106, 106' fixed on to the rotation axis 101 also rotates.

When the motor is operated for a long period of time, the heat (Joule heat) is generated by the stator winding 105 causing the interior temperature of the motor to rise. The radial fan 106, 106' rotates along with the rotation axis 101 and the rotator assembly 102, and directs the circulation of an interior air of the motor. As a result of rotation of the radial fan 106, 106', a heated air existed in between blades of the fans flows to outside by the centrifugal force of the rotation. Accordingly, an interior air pressure of the motor becomes relatively lower than an air pressure of the outside of the motor and the exterior cooler air flows into the interior of the motor through the air inlet 107h, 107'h formed at the horizontal surface of the endshield 107, 107'. Thereafter, the air that induced into the interior of the motor is then drawn out to outside by the fan rotation, thereby the air is continuously circulated. Accordingly, the stator assembly 103 and the rotator assembly 102 are cooled by the air-cooling means to prevent rapid temperature increase in the interior of the motor.

Figure 3:
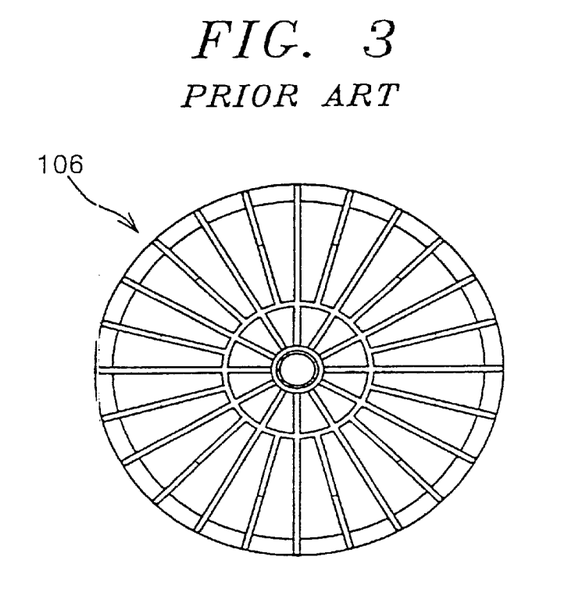
FIG. 3 is a plane view of the radial fan of the conventional induction motor.

As described above, the conventional motor utilizes the radial fan 106, 106' as the cooling means. Referring to FIG. 3, the radial fan 106 placed in the upper portion of the rotator assembly 102 has the characteristics of a small air flow and a high static pressure. As a result, amount of air circulated by the radial fan is limited, thus the cooling effect is not efficient. When the motor is rotating at high speed, heat is generated in the upper and lower portions of the bearing 104, however, there is no cooling means to relieve the generated heat. As a result, oil or grease in the bearing 104 becomes dry causing decline in the performance of the bearing and shorten of the bearing life span.

SUMMARY OF THE INVENTION

It is a primary object of the present invention to obviate the disadvantages of the foregoing prior art by providing a motor with a cooling means which can more efficiently cool the heat generated in the interior of the motor and the bearing during operation of the motor.

These and other objects are satisfied by a motor with a cooling means comprising: a rotation axis; a rotator assembly fixed to the rotation axis; a stator assembly surrounds the rotator assembly; a bearing attached to both ends of the rotation axis to support the rotation axis; an axial-flow fan used as a cooling means placed between each bearing and the rotator assembly to cool the stator assembly and the rotator assembly; an endshield attached to both ends of a housing to protect the structure and consists a plurality of air intakes; and a plurality of cooling pins formed to the outer surface of endshield to draw out the heat generated in the bearing and the interior of the motor during operation of the motor.

Other objects of the present invention are satisfied by a motor with a cooling means comprising: a rotation axis; a rotator assembly fixed to the rotation axis; a stator assembly surrounds the rotator assembly; a bearing attached to both ends of the rotation axis to support the rotation axis; an axial-flow fan used as a cooling means placed between each bearing and the rotator assembly to cool the stator assembly and the rotator assembly; an endshield attached to both ends of a housing to protect the structure and consists a plurality of air intakes; and a plurality of through holes formed to the rotator assembly to circulate the air.

Other objects of the invention are satisfied by a motor with cooling means comprising: a rotation axis; a rotator assembly fixed to the rotation axis; a stator assembly surrounds the rotator assembly; a bearing attached to both ends of the rotation axis to support the rotation axis; a hybrid fan formed from combination of the radial fan and the axial-flow fan used as a cooling means placed between each bearing and the rotator assembly to cool the stator assembly and the rotator assembly; an endshield attached to both ends of a housing to protect the structure and consists a plurality of air intakes; and a plurality of through holes formed to the rotator assembly to circulate the air. Wherein, the hybrid fan comprises: a hub having two cylinders with the different radius are connected to the axis direction; an axial-flow fan placed in the outer surface of the cylinder of the hub of a larger radius; and a radial fan placed in the outer surface of the cylinder of the hub with a smaller radius.

From the subsequent detailed description, appended claims and drawings, other objects and advantages of the present invention will become apparent to those skilled in the art.

DETAILED DESCRIPTION OF THE INVENTION

Figure 4:
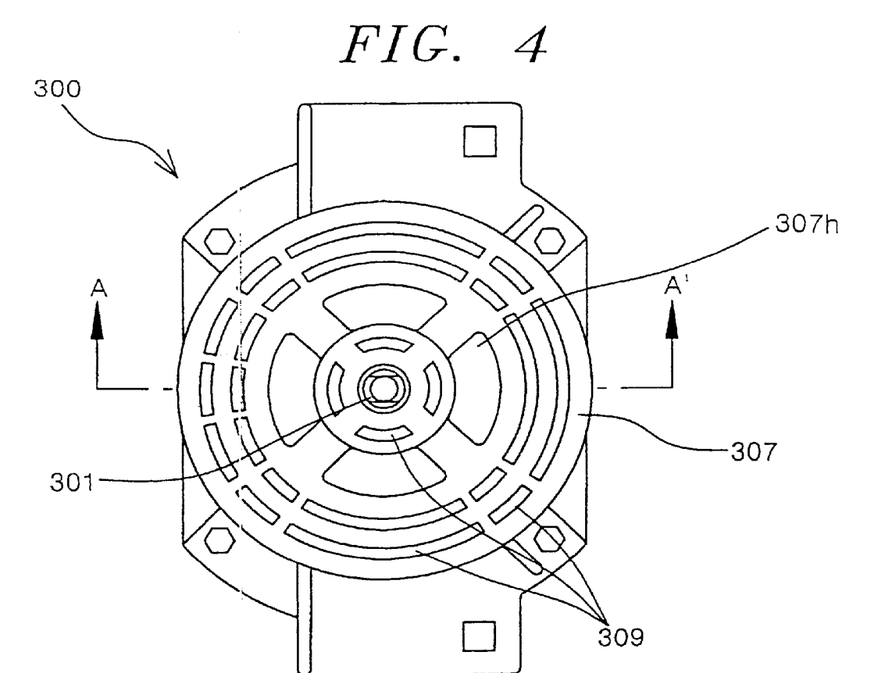
FIG. 4 is a plane view of the first embodiment of a motor with a cooling means in accordance with the present invention.
Figure 5:
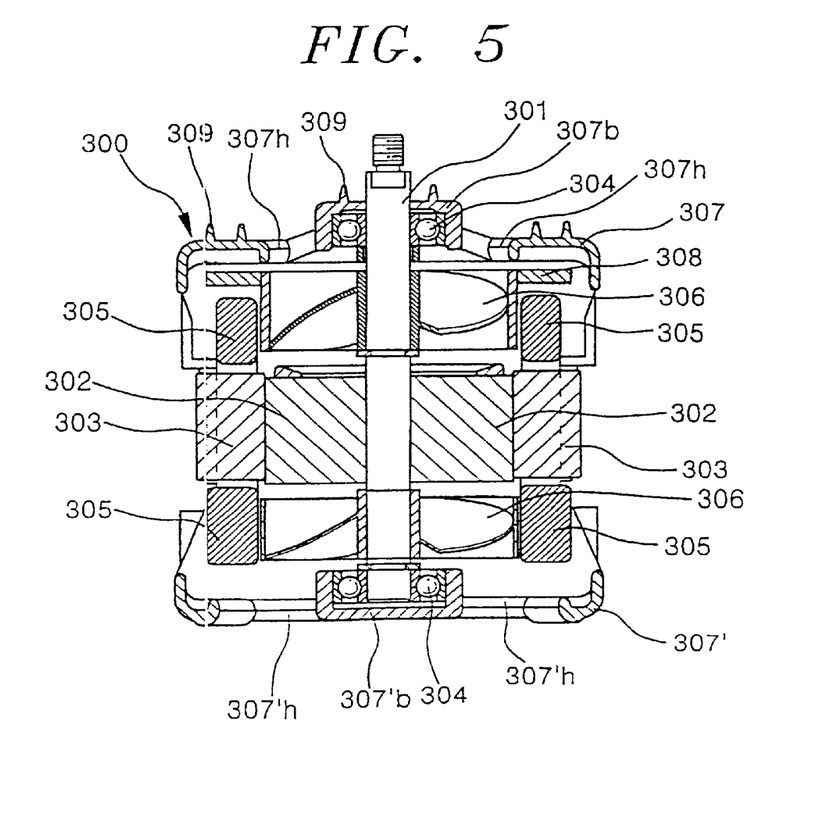
FIG. 5 is a cross sectional view along line A–A' in FIG. 4.

Referring to FIG. 4 and FIG. 5, a motor 300 in accordance with the first embodiment of the present invention comprises: a rotation axis 301 located in the center of a motor; a rotator assembly 302 fixed to the rotation axis 301 by the pressure and rotates with the rotation axis 301; a stator assembly 303 installed in order to surround the rotator assembly 302; and a bearing 304 installed to support the rotation axis 301. And, a stator winding 305 is individually installed on upper and lower portions of the stator assembly 303.

Figure 6:
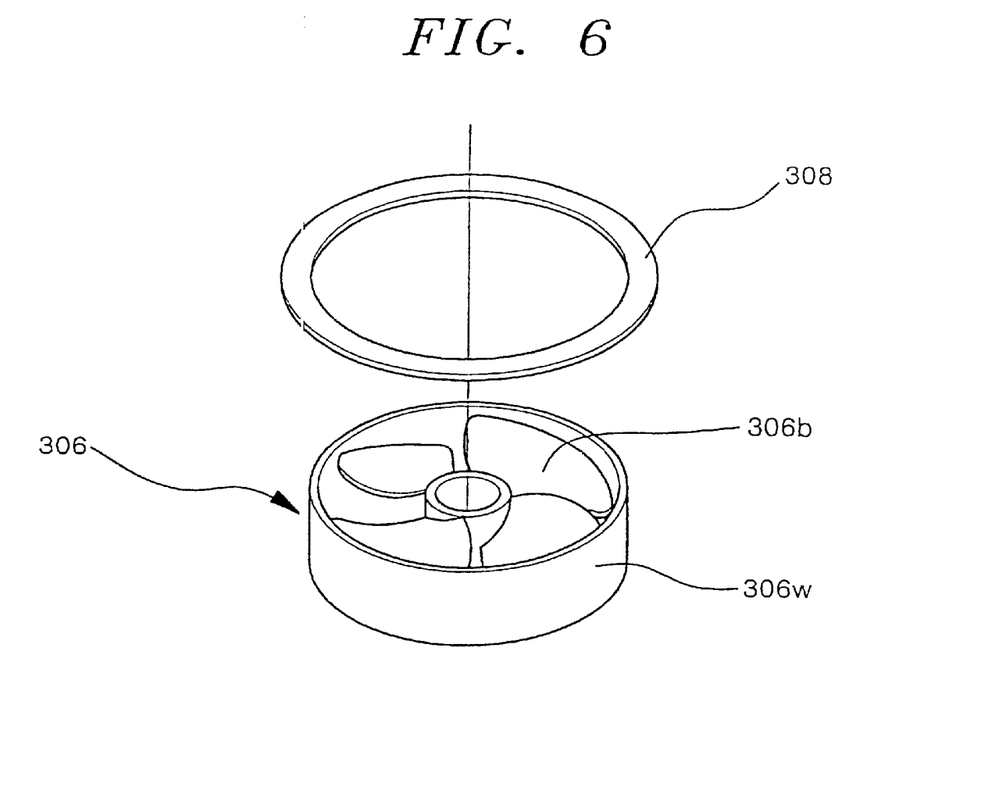
FIG. 6 is a perspective view of a axial-flow fan of the first embodiment of a motor with a cooling means in accordance with the present invention.

Referring to FIG. 6, a ventilation fan, which is an axial-flow fan 306 that has the characteristics of a large air flow and a low static pressure, is installed in between upper and lower bearing 304 and the rotator assembly 302 to cool the interior of the motor. The axial-flow fan 306 is preferably formed in a disc-fan structure, and a blade 306b and a cylindrical outer wall 306w surrounding the blade 306b are constructed in a single body to maintain the stable rotation of the fan and the structured firmness. Preferably one side of the axial-flow fan 306 is attached with a cooling ring 308 in order to increase the cooling efficiency of the stator winding 305. Referring to FIG. 6, the cooling ring 306 can either be a separate part from the axial-flow fan 306 or part of the axial-flow fan 306 through placing it on the cylindrical outer wall. According to the preferred embodiment of the present invention, the axial-flow fan 306 is installed at both upper and lower portions of the rotator assembly 302, however, the radial fan may also be placed in either upper or lower portion of the rotator assembly 302.

An endshield 307, 307' to protect the interior structure, which comprises a bearing housing 307b, 307'b and air intakes 307h, 307'h for circulation of the air, is attached to the outer part of the upper and lower portions of the bearing 304. As illustrated in drawing, a plurality of cooling pins 309 are formed to the outer surface of the endshield 307, 307' to draw out the heat generated in the bearing 304 and the interior of the motor during operation of the motor. Although the cooling pin 309 according to the embodiment of the present invention is in a shape of a concentric circle of the circular arc having the rotation axis 301 as a center, it is not limited particular a shape or a structure. Since the purpose of the cooling pins 309 is to enhance the cooling efficiency, the shape of the cooling pin 309 may be in a rectangular shape and radially placed from the rotation axis 301. The cooling pin 309 can be easily constructed by a die casting method using a material such as aluminum.

Figure 7:
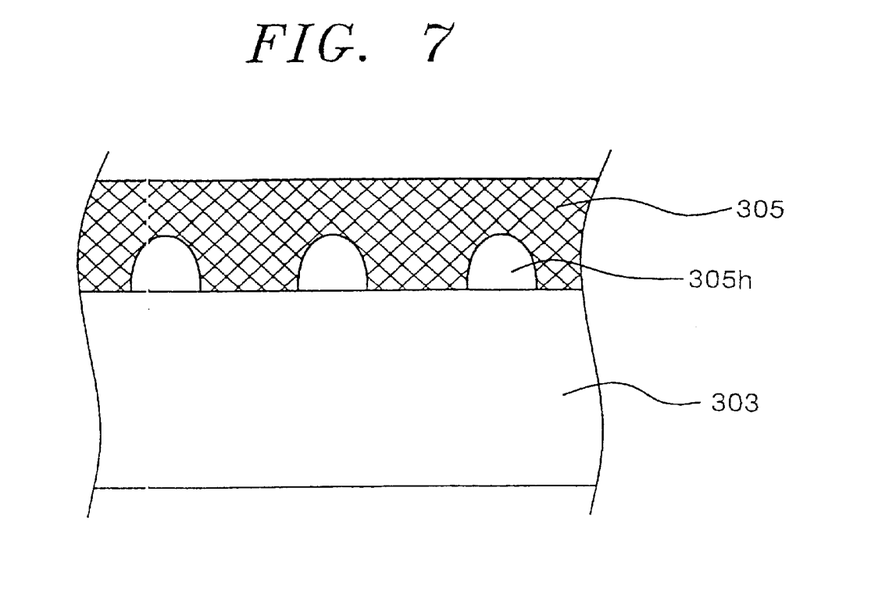
FIG. 7 is a figure of a cooling hole formed to the stator winding in the first embodiment of a motor with a cooling means in accordance with the present invention.
Figure 8:
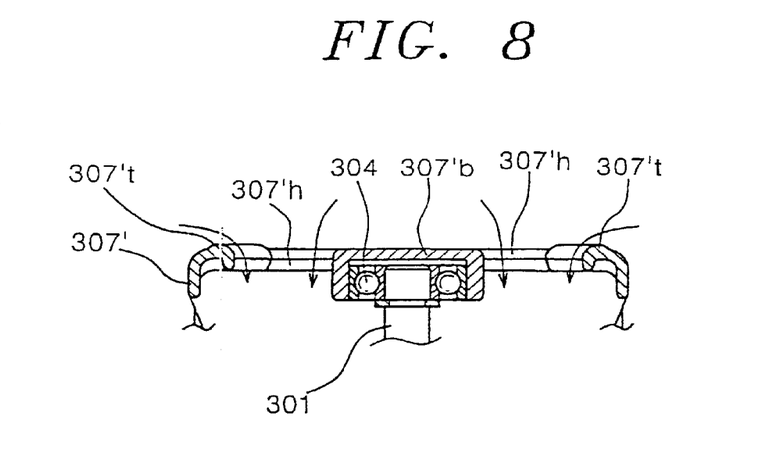
FIG. 8 is a selected view of a rounding protrusion formed to the endshield in the first embodiment of a motor with a cooling means in accordance with the present invention.

As illustrated in FIG. 7, preferably the stator winding 305 is provided with a cooling hole 305h to increase the cooling efficiency of the stator winding 305 by increasing the air circulation rate. The stator winding 305 may be equipped with a cooling hole by winding a coil on a frame with a cooling hole, or winding a coil in a specific way to form a cooling hole when a frame is not used. Winding a coil without using the frame is not a difficult work for those familiar in the art. Referring to FIG. 8, preferably a rounding protrusion 307't is formed to the edge of the air intake 307'h of the endshield 307' to circulate the air drawn in through the air intake 307'h and to increase the cooling area.

A cooling process according to the first embodiment of this invention is described hereinafter with reference to FIG. 4 or FIG. 8.

During a normal operation of the motor, heat (Joule heat) is generated in the stator winding 305 placed in the interior of the motor thereof. As the rotation axis 301 and the axial-flow fan 306 rotate when the rotator assembly 302 rotates, the air circulation between the outside air and the interior air is forced to occur to discharge the heat to outside. Rotation of the axial-flow fan 306 causes the heated air in the inside of the motor flows to the outside through an opening in a lateral part of the motor, and the outside cooling air is drawn in through the air intakes 307h, 307'h placed in the upper and lower endshield 307, 307' thereof Thereafter the air induced into the inside of the motor is discharged to the outside by rotation of the fan. Accordingly, the outside air and the inside air are continuously circulated, thereby the stator assembly 303 with the stator winding 305 and the rotator assembly 302 are cooled through the air cooling method. Since the air passes through the cooling hole 305h of the stator winding 305, the cooling rate of the stator winding 305 is substantially increased. And the cooling effect in the upper portion of the stator winding 305 has been also enhanced as the cooling ring 308 placed in the upper part of the axial-flow fan 306 thereof rotates creating the air circulation in the area around the cooling ring 308. Furthermore, the cooling pins 309 formed to the outer surface of the endshield 307, also directs heat exchange, whereby the heat generated in the bearing 304 and the inside of the motor is discharged to outside. As a result, the bearing is cooled more efficiently, and the cooling rate of the inside of the motor is increased.

Figure 9:
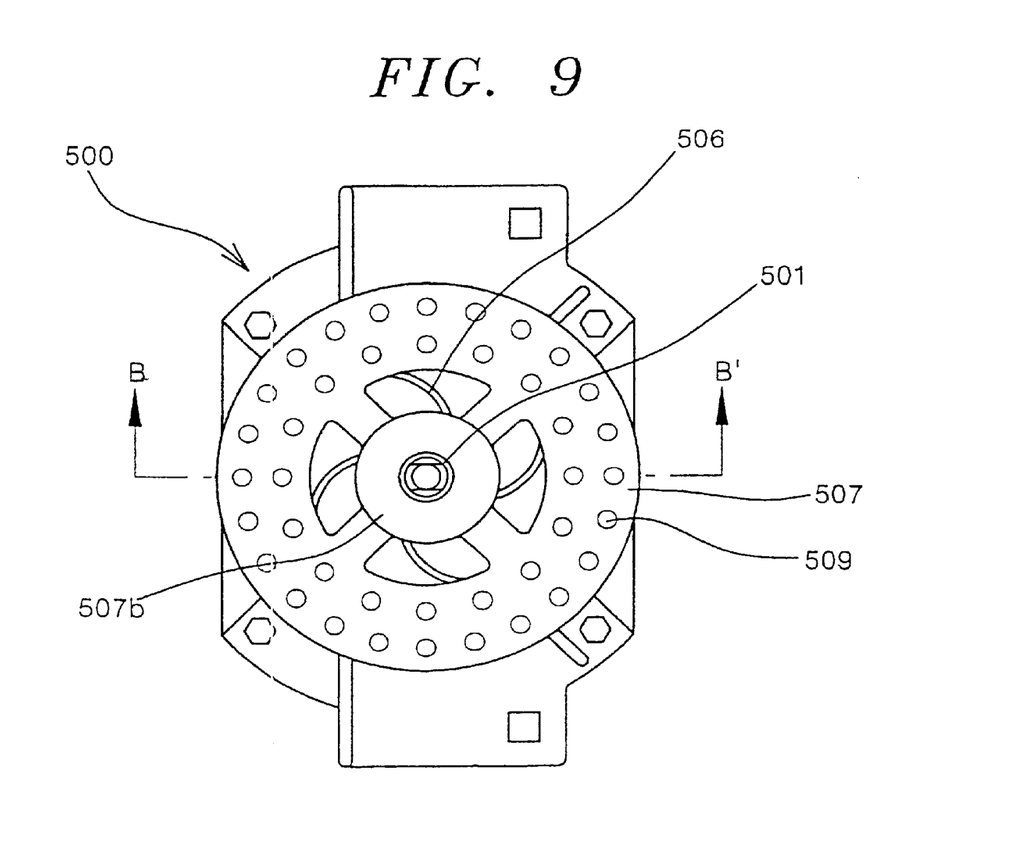
FIG. 9 a plane view of the second embodiment of a motor with a cooling means in accordance with the present invention.
Figure 10:
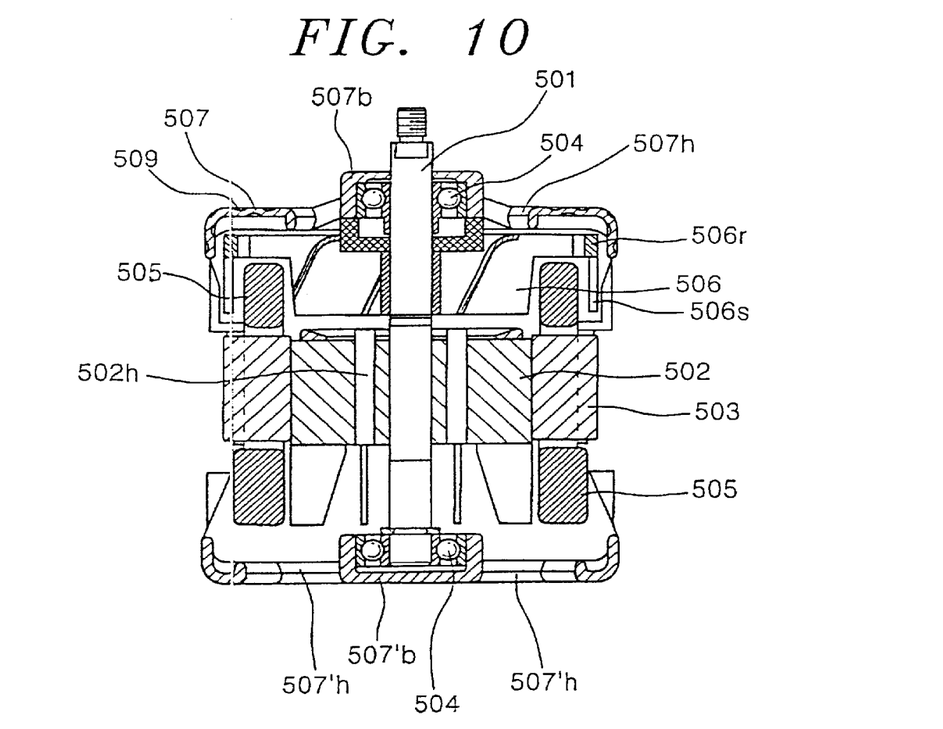
FIG. 10 is a cross sectional view along line B–B' in FIG. 9.

And, FIG. 9 and FIG. 10 shows the second embodiment of a motor with a cooling means in accordance with the present invention, and FIG. 9 is a plane view, and FIG. 10 is a cross sectional view taken along line B–B' in FIG. 9.

The structure of a motor 500 according to the second embodiment of this invention is similar to that of the first embodiment. Therefore, descriptions of the identical members are omitted, and only those with substantially different features are described hereinafter.

Referring the FIGS. 9 and 10, the members most substantially different from the first embodiment are an endshield 507 and a rotator assembly 502.

As illustrated in FIG. 9 and FIG. 10, a plurality of concave grooves 509 are formed to the inner and outer surface of the endshield 507 to enlarge the cooling area. The concave grooves 509, referring to drawings, are formed in a round shape, however, other shapes may be adopted according to the needs.

Referring FIG. 10, a plurality of through holes 502h are formed in series along an axial direction with fixed space separating each hole to the rotator assembly 502 to circulate the air. A plurality of through holes 502h cool the heat in the inside of the motor through active flow of the air as directed by the rotation of an axial-flow fan 506.

Figure 11:
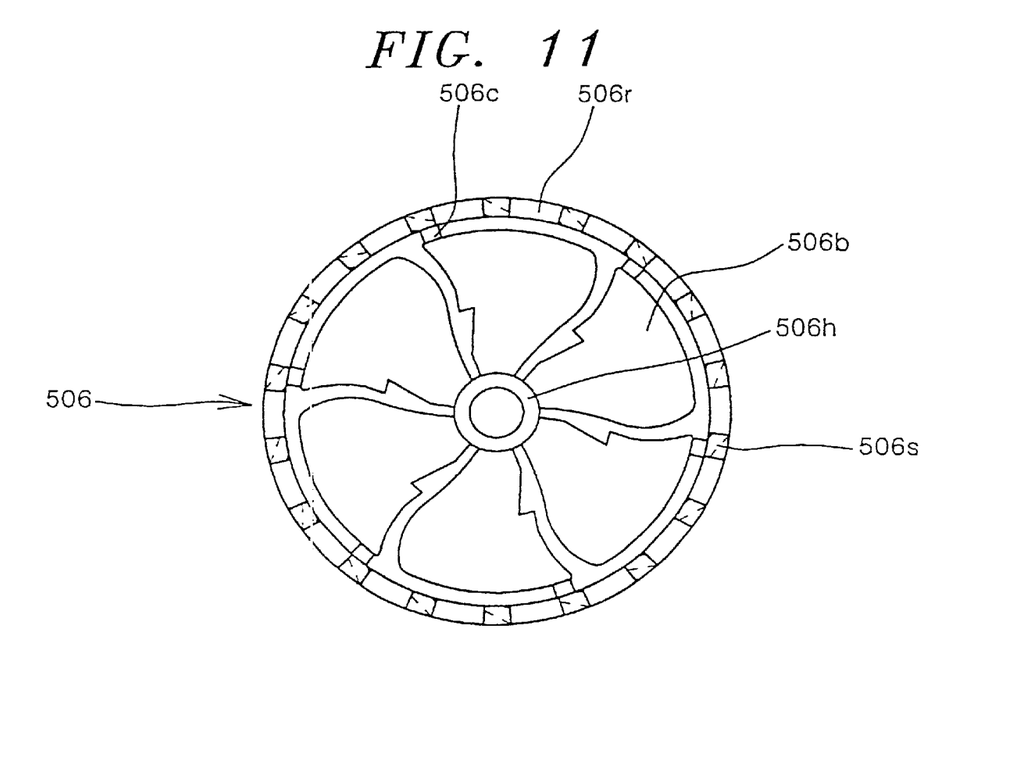
FIG. 11 is a plane view of the axial-flow fan assembly of the second embodiment of a motor with a cooling means in accordance with the present invention.
Figure 12:
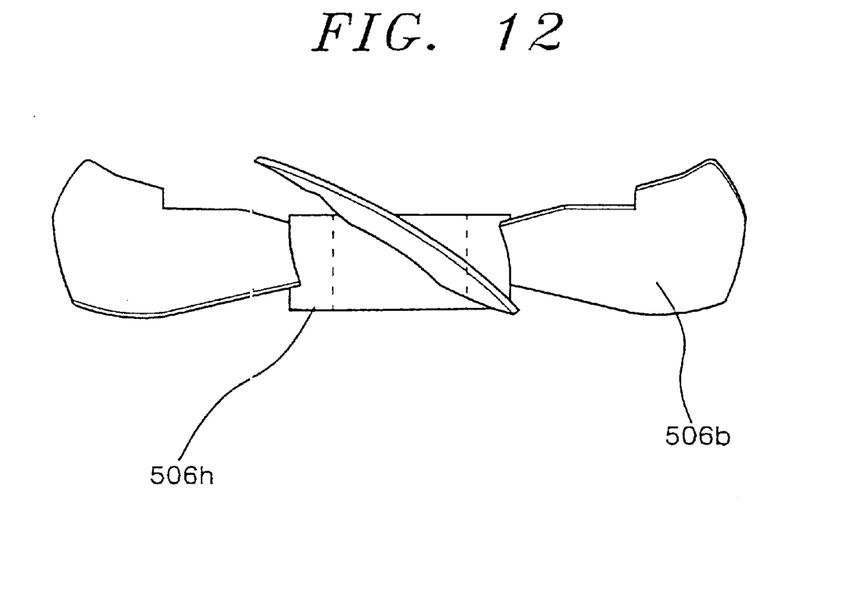
FIG. 12 is lateral view of the body of the axial-flow fan of the axial-flow fan assembly of FIG. 11.

Referring the FIG. 11, similar to the first embodiment, an axial-flow fan 506 is placed in between the bearing 504 and the rotator assembly 502. FIG. 11 shows that the axial-flow fan 506 consists of six blades 506b, however, it is only for an illustration purpose and the number of blades is not limited to six. FIGS. 11 and. 12 show that the shape of the axial-flow fan 506b has a cut part. In the drawings, the part of the blade is cut because of the interference with another members. However, the blade 506b may not be cut if the interior construction of the motor changes.

Referring to FIG. 11, a ring member 506r is installed around the body of the axial-flow fan 506 to protect the blade 506b and stabilize rotation of the fan. The ring member 506r has a plurality of strips 506s placed in fixed space and is connected to the body of the fan 506 via connecting means 506c to form a single unit. The strips 506s connected to the body of the fan 506 via connecting means 506c rotates when the fan and the connecting means 506c rotate so that the air flow rate in the inside of the motor increases.

According to the second embodiment of the present invention, the air in the interior of the motor 500 is forced to flow to the outside when fan 506 rotates, whereby the heat generated in inside of the motor 500 is discharged to outside.

The air is circulated through a plurality of through holes 502h placed in the rotator assembly 502, thus cooling the inside of the motor is enhanced. And, by the rotation of the strip 506s placed at the ring member 506r of the axial-flow fan 506, the air flow rate increases in the area around the strip 506s resulting in an improved cooling effect of the upper portion of the stator winding 505. In FIGS. 9 to 12, the reference number 501 is a rotation axis, 503 is a stator assembly, 506h is a hub, 507b and 507'b are a bearing housing and 507h and 507'h are an air intake.

Figure 13:
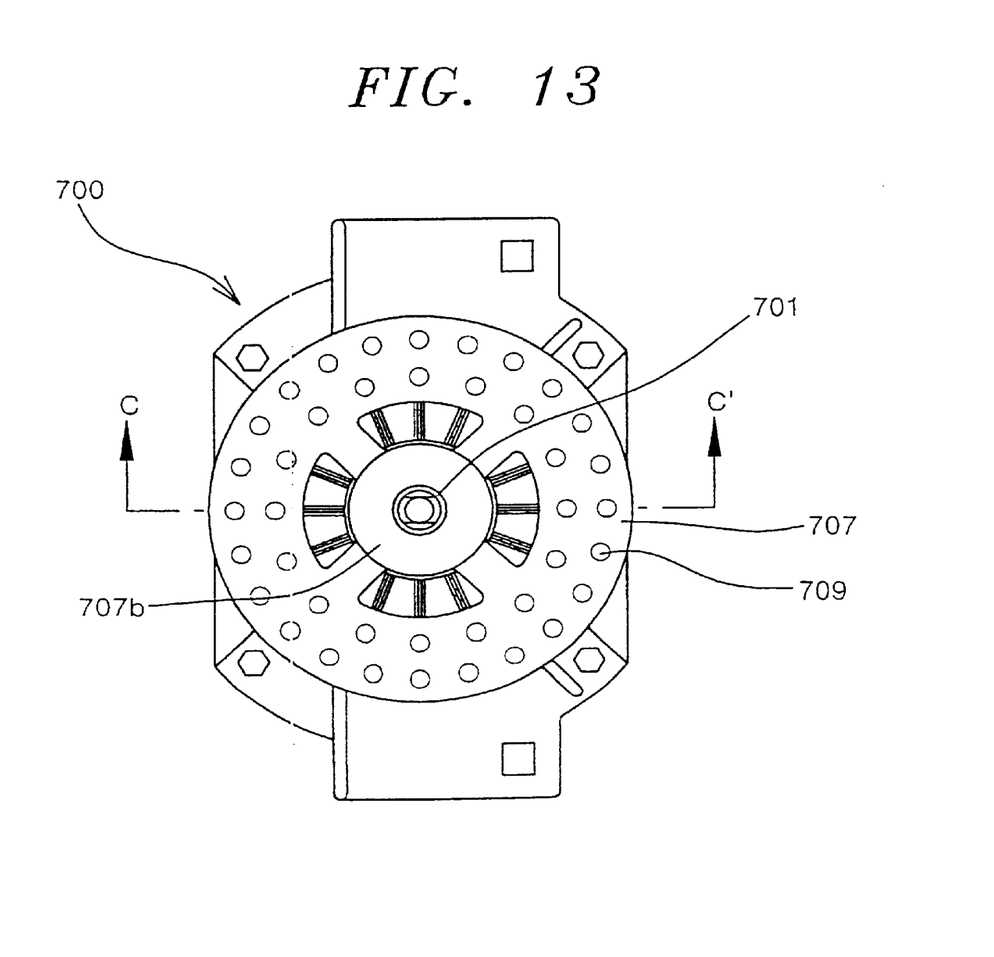
FIG. 13 is a plane view of the third embodiment of a motor with a cooling means in accordance with the present invention.
Figure 14:
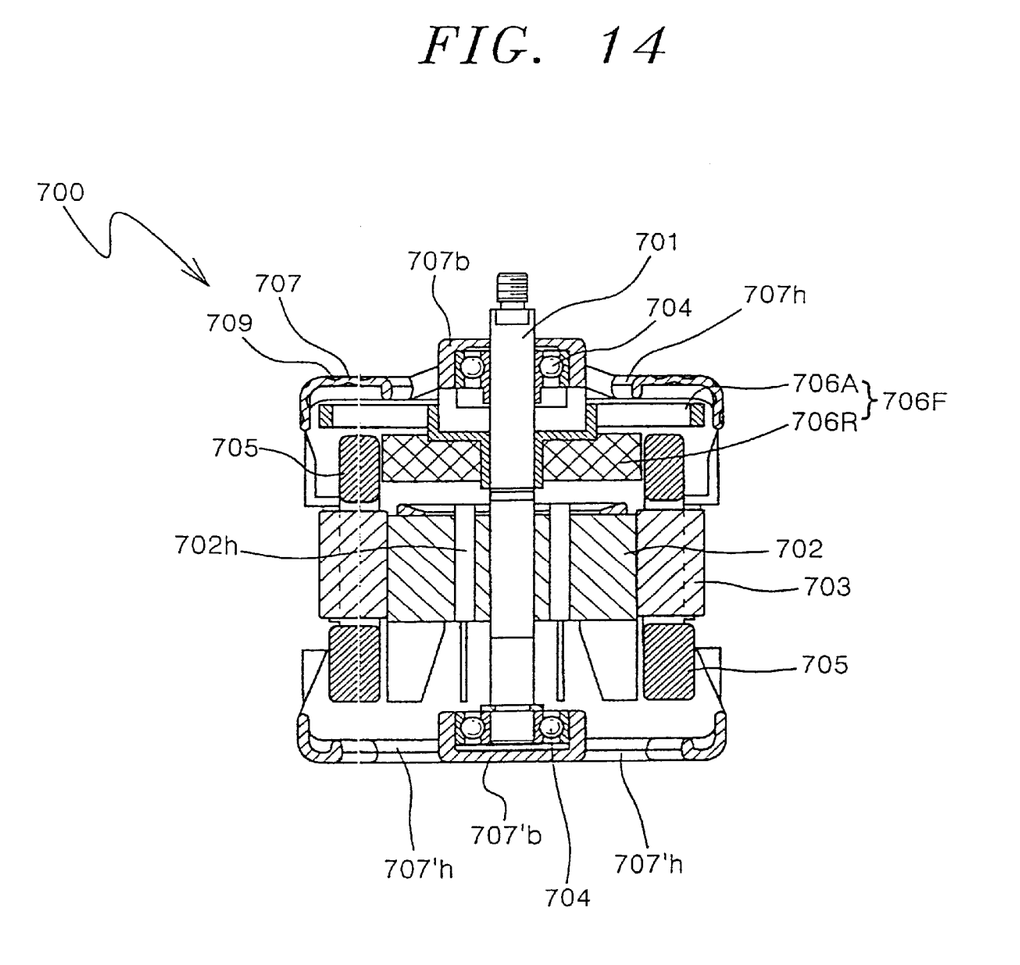
FIG. 14 is a cross sectional view along line C–C' in FIG. 13.

FIGS. 13 to 14 show a third embodiment of a motor with a cooling means in accordance with the present invention, in which FIG. 13 is a plane view and FIG. 14 is a cross sectional view along line C–C' in FIG. 13.

The construction of a motor 700 of the third embodiment of this invention is similar to that of the second embodiment. Therefore, the detailed descriptions of the identical members are omitted.

However, the structure of a fan 706F located between an upper bearing 704 and a rotator assembly 702 is substantially different from that of the second embodiment.

Figure 15:
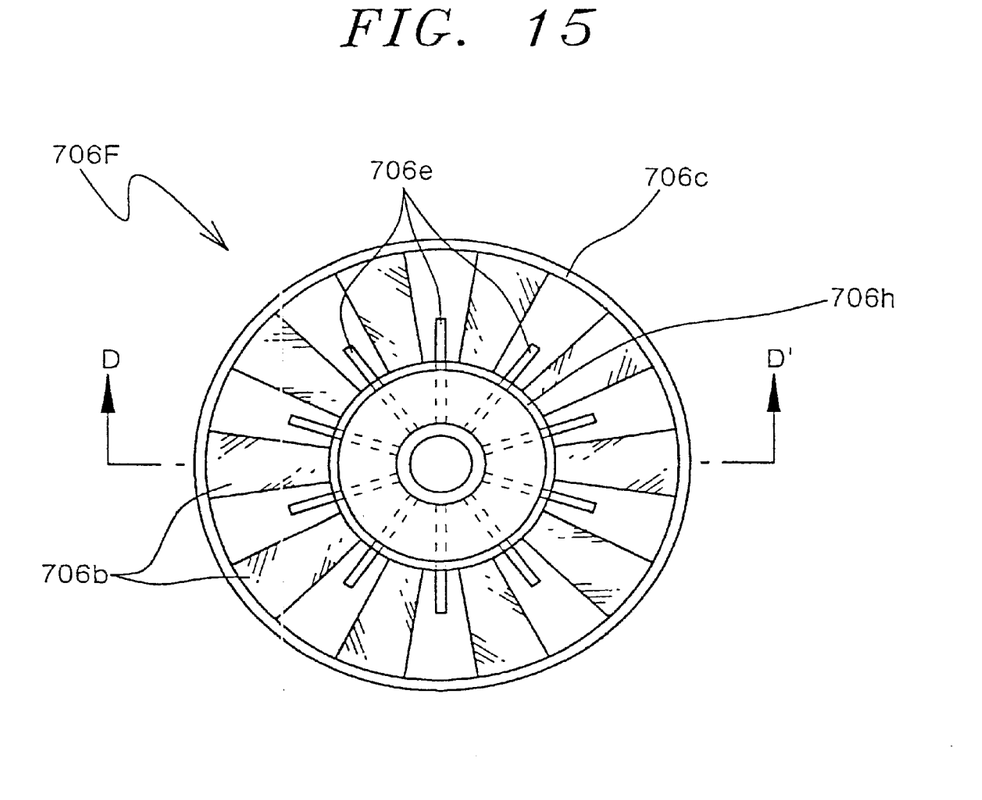
FIG. 15 a plane view of the first embodiment of the hybrid fan adopted to the third embodiment of a motor with a cooling means in accordance with the present invention.
Figure 16:
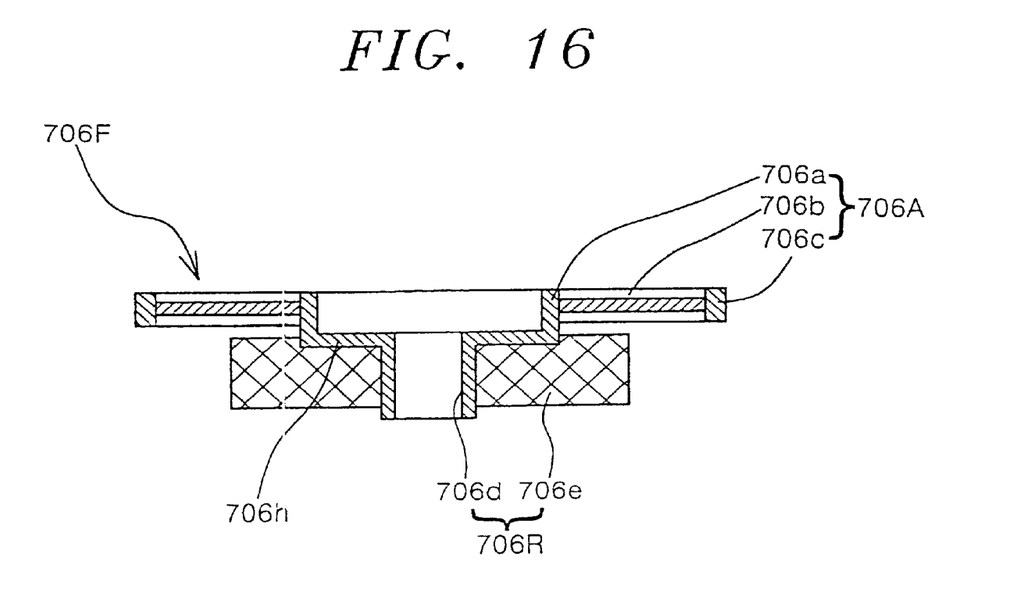
FIG. 16 is a cross sectional view along line D–D' in FIG. 15.

Referring to FIGS. 15 and 16, a hybrid fan 706F formed from combination of the axial-flow fan and the radial fan is used as the upper fan of a motor in the third embodiment. FIGS. 15 and 16 show a first illustration of a hybrid fan adopted to a motor according to the third embodiment of the present invention. A hybrid fan 706F of the first illustration comprises: a hub 706h in which the two cylinders with a different radius are connected in the axial direction; an axial-flow fan 706A placed in the outer surface of the cylinder of the hub 706h with a larger radius; and a radial fan 706R placed in the outer surface of the cylinder of the hub 706h with a smaller radius.

The axial-flow fan 706A comprises a larger radius cylinder 706a of the hub 706h, a plurality of axial-flow blades 706b radially placed in the larger radius cylinder 706a and a ring member 706c connecting a plurality of axial-flow blade 706b to each other. And, the radial fan 706R comprises a smaller radius cylinder 706d of the hub 706h; and a plurality of radial fan blade 706e radially placed in the large radius cylinder 706a.

Figure 17:
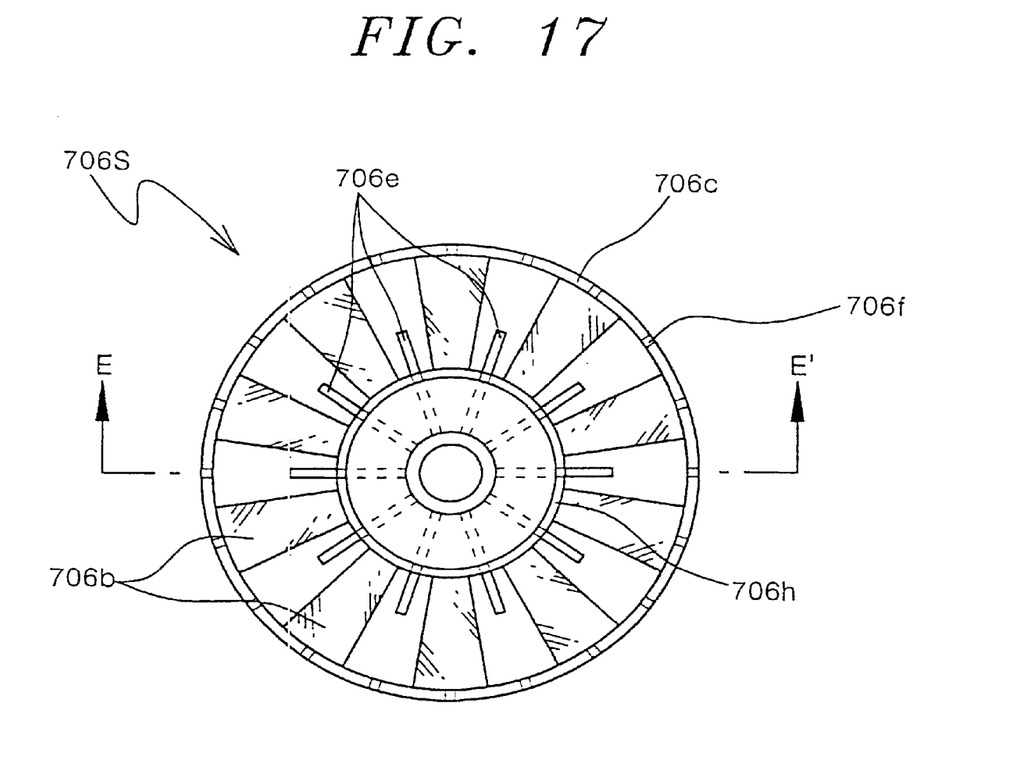
FIG. 17 is a plane view of the second embodiment of the hybrid fan adopted to the third embodiment of a motor with a cooling means in accordance with the present invention.
Figure 18:
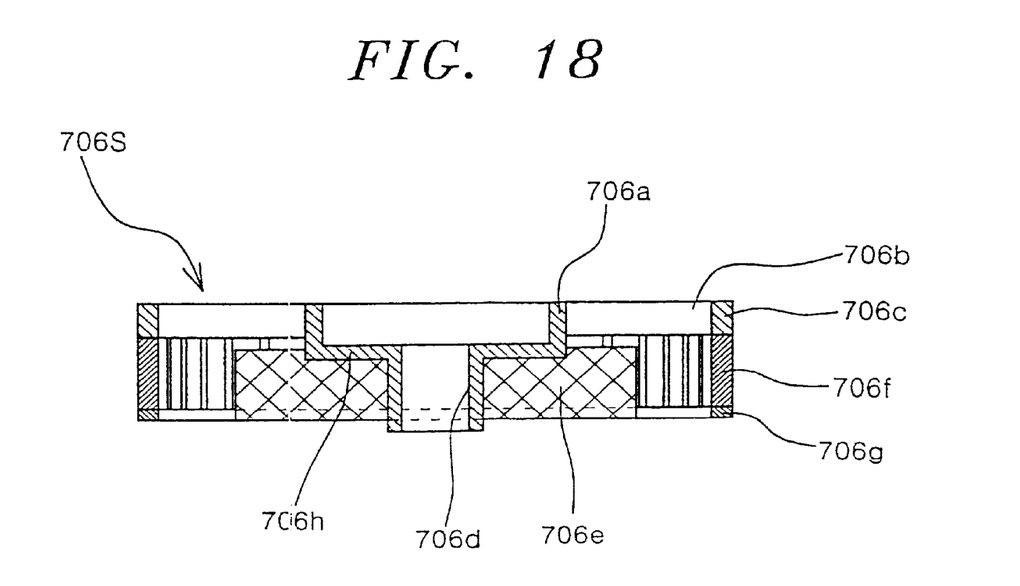
FIG. 18 is a cross sectional view along line E–E' in FIG. 17.

FIGS. 17 and 18 show a second illustration of the hybrid fan used in the motor according to the third embodiment of this invention. The structure of the second illustration is similar to that of the first illustration. In the hybrid fan 706S of the second illustration, a plurality of strips 706f are placed in a fixed distance at the lower part of a first ring member 706c which connects terminals of a plurality of axial-flow blades 706b to each other. A second ring member 706g, which connects a plurality of strips 706f to each other, is placed in the lower part of a plurality of strips 706f. The hybrid fan 706S of the second illustration consists the function of the hybrid fan 706F of the first illustration and the function of the radial fan by a plurality of strips 706f. Thus the air flow rate in the inside of the motor has been increased as the air circulation in the area where a plurality of strips 706f are placed is enhanced due to the radial fan function of the strips 706f.

Figure 19:
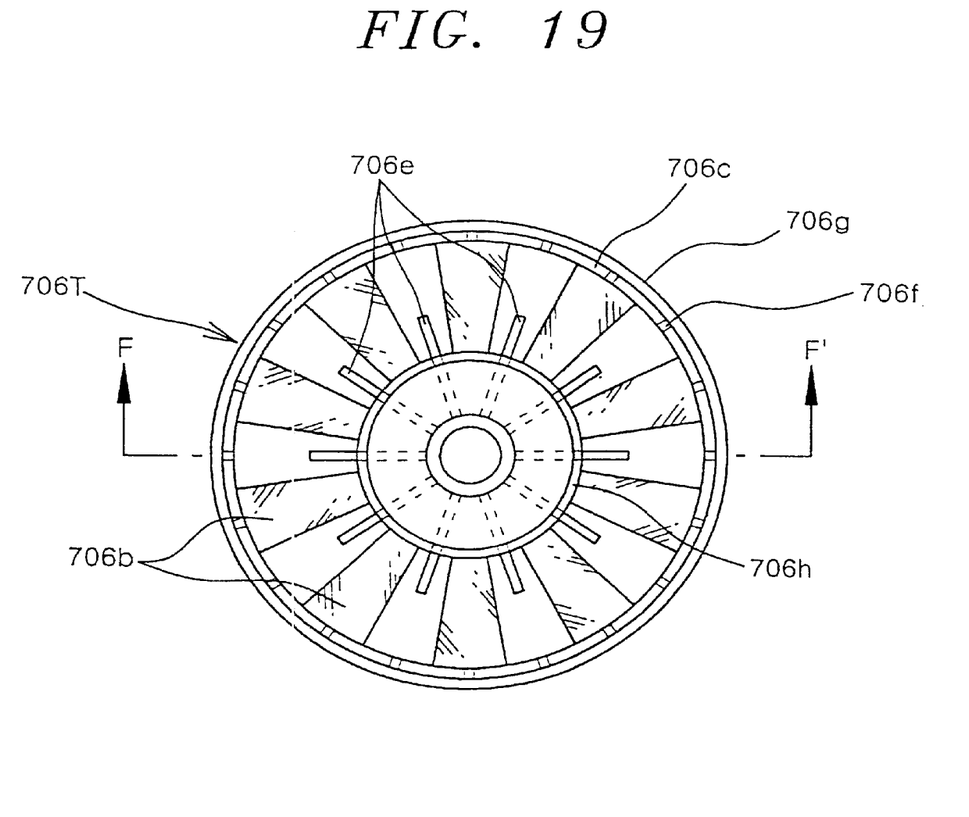
FIG. 19 is a plane view of the third embodiment of the hybrid fan adopted to the third embodiment of a motor with a cooling means in accordance with the present invention.
Figure 20:
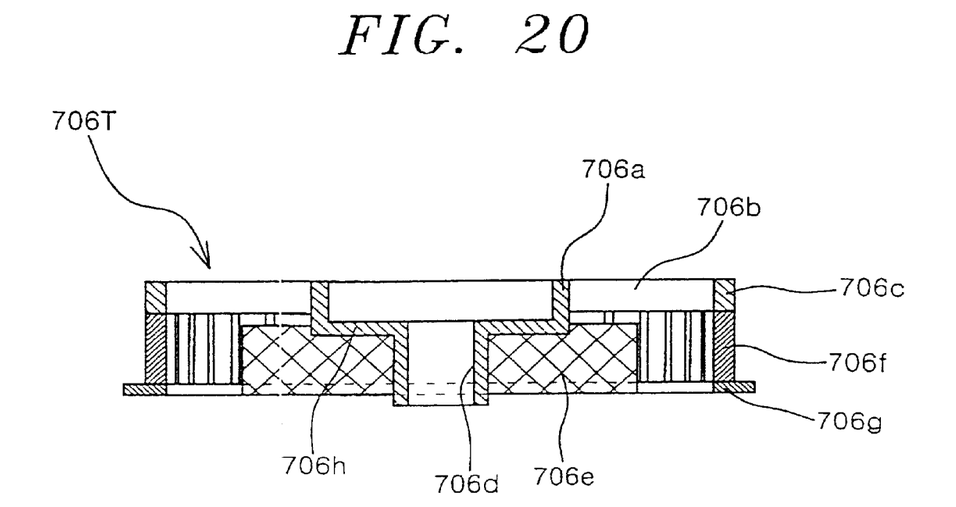
FIG. 20 is a cross sectional view along line F–F' in FIG. 19.

FIG. 19 and FIG. 20 show a third illustration of the hybrid fan adopted to a motor according to the third embodiment of this invention. The structure of a hybrid fan of the third illustration is similar to that of the second illustration. However, a hybrid fan 706T of the third illustration is different from that of the second illustration in the size of the outer circumferential surface of the ring member 706g connecting the lower of a plurality of strips 706f which is larger than that of the ring member 706c connecting the terminals of a plurality of axial-flow blades 706b. The function of a hybrid fan of the third illustration is similar to that of the second embodiment, except for the air flow function which has been improved by a plurality of strips 706f and the second ring member 706g connecting the strips 706f.

When the motor 700 according to the third embodiment of the present invention, which is respectively provided with the first, second and third illustrations 706F, 706S, 706T of the hybrid fan, is operated, the heat generated in the inside of the motor is exhausted as the outside air and the inside air are forced to circulate.

As described above, as the air passes through a plurality of through holes 702h placed in the rotator assembly 702, the air flow rate increases and as a result, the cooling efficiency in the interior of the motor is substantially enhanced. Particularly, the axial-flow fan 706A and the radial fan 706R of the hybrid fans 706F, 706S and 706T operate at the same time, thus and the air is more efficiently flown in the directions of the axis and radius of the motor.

As described above, a motor with a cooling means in accordance with the present invention uses the axial-flow fan or the hybrid fan with a large air flow and a low static pressure instead of the convention radial fan with a small air flow and a high static pressure in order to cool the interior of the motor. And, in the rotator assembly, a plurality of through holes are formed in order to direct the air to flow more effectively. An endshiled is equipped with cooling pins or concave grooves to enlarge the cooling area, thereby the cooling efficiency has been substantially improved from the convention motor. As a result, the operation characteristics of the motor has been stabilized and the motor life span has been extended.

What is claimed is:

1. A motor, comprising:
   a rotation axis;
   a rotator assembly fixed to the rotation axis;
   a stator assembly surrounding the rotator assembly;
   a beating attached to both ends of the rotation axis to support the rotation axis; and
   a hybrid fan formed from a combination of a radial fan and an axial-flow fan placed between one of the beatings and the rotator assembly to cool the stator assembly and rotator assembly, wherein the hybrid fan has both radial fan blades and axial fan blades.

2. The motor of claim 1, wherein the hybrid fan comprises:
   a hub having two cylinders with different radius are connected in an axial direction, wherein the axial flow fan is attached to an outer surface of the cylinder having the larger radius, and the radial fan is attached to an outer surface of the cylinder having the smaller radius.

3. The motor of claim 2, wherein the axial-flow fan comprises:
   the larger radius cylinder;
   a plurality of axial-flow blades radially attached to the larger radius cylinder a fixed distance apart; and
   a first ring member connecting the plurality of axial-flow blades to each other.

4. The motor of claim 3, further comprising:
   a plurality of strips attached to a lower portion of the ring member a fixed distance apart, and a second ring member attached to a lower portion of the plurality of strips to connect the plurality of strips.

5. The motor of claim 4, wherein an outer radius of the second ring member is larger than that of the first ring member.

6. The motor of claim 9, further comprising:
   a hub to which the radial fan blades and axial fan blades are both attached.

7. The motor of claim 6, wherein the hub has a first portion having a first radius, and a second portion having a second radius, wherein the first radius is larger than the second radius.

8. The motor of claim 7, wherein the axial fan blades are attached to the first portion of the hub radially spaced equidistance apart, and the radial fan blades are attached to the second portion of the hub radially spaced equidistance apart.

9. The motor of claim 1, further comprising:
   a plurality of through holes formed in the rotator assembly to circulate the air.

10. The motor of claim 1, further comprising:
    a second fan placed between the other of the bearings and the rotator assembly to cool the stator assembly and rotator assembly.

11. The motor of claim 1, further comprising an endshield attached to both ends of a housing to protect the structure and comprising a plurality of air intake.

12. A motor, comprising:
    a rotation axis;
    a rotator assembly fixed to the rotation axis;
    a stator assembly surrounding the rotator assembly;
    a bearing attached to both ends of the rotation axis to support the rotation axis; and
    a hybrid fan formed from a combination of a radial fan and an axial-flow fan placed between one of the bearings and the rotator assembly to cool the stator assembly and rotator assembly, wherein the hybrid fan comprises:
    a hub having two cylinders with different radius connected in an axial direction;
    an axial flow fan attached to an outer surface of the cylinder having the larger radius; and
    a radial fan attached to an outer surface of the cylinder having the smaller radius.

13. The motor of claim 12, wherein the axial-flow fan comprises:
    the larger radius cylinder;
    a plurality of axial-flow blades radially attached to the larger radius cylinder a fixed distance apart; and
    a first ring member connecting the plurality of axial-flow blades to each other.

14. The motor of claim 13, further comprising a plurality of strips attached to a lower portion of the ring member a fixed distance apart, and a second ring member attached to a lower portion of the plurality of strips to connect the plurality of strips.

15. The motor of claim 14, wherein an outer radius of the second ring member is larger than that of the first ring member.

16. The motor of claim 12, further comprising an endshield attached to both ends of a housing to protect the structure and comprising a plurality of air intake.

17. A motor, comprising:
    a rotation axis;
    a rotator assembly fixed to the rotation axis;
    a stator assembly surrounding the rotator assembly;
    a bearing attached to both ends of the rotation axis to support the rotation axis; and
    a hybrid fan formed from a combination of a radial fan and an axial-flow fan placed between one of the bearings and the rotator assembly to cool the stator assembly and rotator assembly, wherein the hybrid fan has both radial fan blades and axial fan blades, the motor further comprises a hub to which the radial fan blades and axial fan blades are both attached, and the hub has a first portion having a first radius, and a second portion having a second radius, wherein the first radius is larger than the second radius.

18. The motor of claim 17, wherein the axial fan blades are attached to the first portion of the hub radially spaced equidistance apart, and the radial fan blades are attached to the second portion of the hub radially spaced equidistance apart.

19. The motor of claim 17, further comprising an endshield attached to both ends of a housing to protect the structure and comprising a plurality of air intake.

* * * * *